United States Patent
Radojicic (10) Patent No.: US 12,406,327 B2
(45) Date of Patent: Sep. 2, 2025

(54) SYSTEMS, METHODS, AND MEDIA FOR DETERMINING A STOPPING CONDITION FOR MODEL DECIMATION

(71) Applicant: Bentley Systems, Incorporated, Exton, PA (US)

(72) Inventor: Aleksandar Radojicic, Ivry sur Seine (FR)

(73) Assignee: Bentley Systems, Incorporated, Exton, PA (US)

( * ) Notice: Subject to any disclaimer, the term of this patent is extended or adjusted under 35 U.S.C. 154(b) by 343 days.

(21) Appl. No.: 17/974,770

(22) Filed: Oct. 27, 2022

(65) Prior Publication Data

US 2024/0144419 A1 May 2, 2024

(51) Int. Cl.
*G06T 3/4023* (2024.01)
*G06T 7/00* (2017.01)
*G06T 7/62* (2017.01)

(52) U.S. Cl.
CPC .......... *G06T 3/4023* (2013.01); *G06T 7/0002* (2013.01); *G06T 7/62* (2017.01)

(58) Field of Classification Search
CPC ....... G06T 3/4023; G06T 7/0002; G06T 7/62; G06T 3/4046
See application file for complete search history.

(56) References Cited

U.S. PATENT DOCUMENTS

| | | | | |
|---|---|---|---|---|
| 9,589,318 B2 * | 3/2017 | DeJonge | ................. | G06T 11/40 |
| 10,459,706 B1 * | 10/2019 | Little | ........................ | G06F 8/51 |
| 2003/0046617 A1 * | 3/2003 | MacPherson | ........... | G06T 17/20 |
| | | | | 714/48 |
| 2006/0013505 A1 * | 1/2006 | Yau | ........................ | G06V 20/64 |
| | | | | 382/285 |
| 2008/0062171 A1 * | 3/2008 | Kim | ........................ | G06T 17/20 |
| | | | | 345/423 |

(Continued)

FOREIGN PATENT DOCUMENTS

CN 101308579 A * 11/2008

OTHER PUBLICATIONS

Manocha, Dinesh, "GAPS: General and Automatic Polygonal Simplification", May 1999, 12 pages.

(Continued)

*Primary Examiner* — Henok Shiferaw
*Assistant Examiner* — Woo C Rhim
(74) *Attorney, Agent, or Firm* — Cesari and McKenna, LLP (57) ABSTRACT

Techniques are provided for determining a stopping condition for 3D model decimation process. In an embodiment, a size of the 3D model may be determined based on a minimum oriented bounding box, wherein the 3D model includes vertices, edges, and faces that define a shape of a physical object. A smallest dimension value of the minimum oriented bounding box may be selected to represent the size of the 3D model. The selected dimensions value may be multiplied by a decimation factor to generate a stopping condition value. A decimation process may be performed on the 3D model until all remaining elements (e.g., edges) of the 3D model have an error value that is equal to or greater than the stopping condition value. As such, the level of detail of the 3D model is simplified while also preserving the shape of the 3D model.

20 Claims, 5 Drawing Sheets

(56) References Cited

U.S. PATENT DOCUMENTS

| | | | |
|---|---|---|---|
| 2009/0174711 A1* | 7/2009 | Lee | G06T 17/20 |
| | | | 345/420 |
| 2010/0277476 A1* | 11/2010 | Johansson | G06T 17/20 |
| | | | 345/423 |
| 2014/0168360 A1* | 6/2014 | Ahn | G06T 9/001 |
| | | | 348/42 |
| 2014/0368498 A1* | 12/2014 | Wei | G06T 17/205 |
| | | | 345/420 |
| 2016/0379406 A1* | 12/2016 | Le Geyt | G06F 3/0482 |
| | | | 345/420 |
| 2017/0228894 A1* | 8/2017 | Deleplace | G06T 9/001 |
| 2019/0080512 A1* | 3/2019 | Johansson | G06T 17/205 |
| 2019/0088013 A1* | 3/2019 | Baeli | G06T 17/205 |
| 2019/0278293 A1* | 9/2019 | Levinson | G06T 17/20 |
| 2021/0256763 A1* | 8/2021 | Huang | G06T 19/20 |
| 2021/0343082 A1* | 11/2021 | Kim | G06T 9/001 |
| 2022/0084286 A1* | 3/2022 | Reddy | B33Y 50/00 |
| 2023/0104518 A1* | 4/2023 | Wu | G06T 17/00 |
| | | | 703/1 |
| 2023/0306643 A1* | 9/2023 | Graziosi | H04N 19/597 |
| 2023/0360328 A1* | 11/2023 | Gao | G06T 15/205 |
| 2024/0144419 A1* | 5/2024 | Radojicic | G06T 7/0002 |

OTHER PUBLICATIONS

Anahid Ghazanfarpour. Proximity-aware multiple meshes decimation using quadric error metric. Multimedia [cs.MM]. Université Paul Sabatier—Toulouse III, 2019. English. □NNT : 2019TOU30168, Submitted May 26, 2020, 109 pages.

* cited by examiner

SYSTEMS, METHODS, AND MEDIA FOR DETERMINING A STOPPING CONDITION FOR MODEL DECIMATION

BACKGROUND

Technical Field

The present disclosure relates generally to computer models, and more specifically to determining a stopping condition for computer model decimation.

Background Information

In the design, construction and/or operation of infrastructure (e.g., buildings, factories, roads, railways, bridges, electrical and communication networks, equipment, etc.) it is often desirable to create models, e.g., three-dimensional (3D) high-resolution computer models, of a scene in which the infrastructure is built, or planned to be built.

Particular applications may generate a high-resolution 3D model of a scene that includes one or more physical objects. The 3D model of the scene may include a is different 3D model for each object in the scene.

Each 3D model may be referred to as a 3D mesh. The 3D mesh may be represented by a collection of vertices, i.e., points, that can be connected by edges, and a closed set of three or more edges may connect to form faces on flat surfaces. The vertices, edges, and faces define the 3D mesh which represents the physical surface, i.e., shape, of the object.

Mesh decimation is the process of simplifying the level of detail of the 3D mesh by reducing the number of vertices, edges, and/or faces that define the 3D mesh. Some conventional mesh decimation processes may utilize user provided input values to determine when the mesh decimation process should stop. These conventional techniques require that the user understand the relationship between the shape/size of the 3D mesh and the decimation process such that a correct input value can be provided for each different sized/shaped 3D mesh. If, for example, the user provides an input value that does not correctly account for the size of the 3D mesh, the mesh decimation process may stop too soon such that not enough faces are removed to simplify the 3D mesh, or the mesh decimation process may stop too late such that the shape of the 3D mesh is destroyed, i.e., the visual shape of the 3D mesh is not preserved.

Other conventional techniques may normalize a decimation error value utilizing the surfaces of the 3D mesh to determine when the mesh decimation process should stop. With such conventional techniques, large surfaces (e.g., triangle faces) get easily decimated from the 3D mesh while smaller surfaces are more likely to be preserved in the 3D mesh. This can, in many instances, lead to a 3D mesh that is destroyed.

Therefore, what is needed is a more efficient and accurate technique for determining a stopping condition for 3D model decimation that sufficiently simplifies the level of detail of the 3D model without destroying the 3D model, e.g., without substantially altering the visual appearance, i.e., shape, of the 3D mesh.

SUMMARY

Techniques are provided for determining a stopping condition for 3D model decimation. Specifically, the stopping condition may be determined based on a size of the 3D model that represents an object such that the level of detail of the 3D model is simplified while preserving the shape of the 3D model. In an embodiment, preserving the shape means that the visible shape, e.g., visually perceived shape, of the 3D model is not substantially altered such that the shape of 3D model before and after performance of the decimation process is substantially the same.

In an embodiment, a processor, e.g., a decimation module executed by the processor, may determine a size of the 3D model. Specifically, the processor may determine a minimum oriented bounding box that surrounds the vertices, edges, and faces that define the 3D model that represents the physical object. The processor may select a smallest dimension of the minimum oriented bounding box as being representative of the size of the 3D model. The processor may multiply the selected dimension by a decimation factor to determine the stopping condition, i.e., stopping condition value, for the decimation process.

The processor may perform the model decimation process utilizing the stopping condition value determined according to the one or more embodiments as described herein. Specifically, the processor may calculate an error value for each element (e.g., edge) of the 3D model. In an embodiment, the error values may be calculated utilizing a Quadric Error Metric that accounts for a size of the 3D model. The processor may compare the error value, for each element, to the stopping condition value. In response to determining that at least one element of the 3D model have an error value that is less than the stopping condition value, the processor may remove the element with the lowest error value.

The processor may recalculate the error value for each element that is affected by the removal of the element. For example, the processor may recalculate the error value for each edge that shared a vertex with the removed edge. The processor may compare the calculated and/or recalculated error values with the stopping condition value to remove an element (e.g., edge) of the 3D model that has the lowest error value that is less than the stopping condition value. The recalculation and comparison, e.g., of the calculated and/or recalculated error values with the stopping condition value, are repeated until all remaining elements of the 3D model have error values that are equal to or greater than the stopping condition value. The decimation process stops when all remaining elements of the 3D model have error values that are equal to or greater than the stopping condition value. The resulting 3D model is sufficiently simplified and the shape of the 3D model is preserved.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
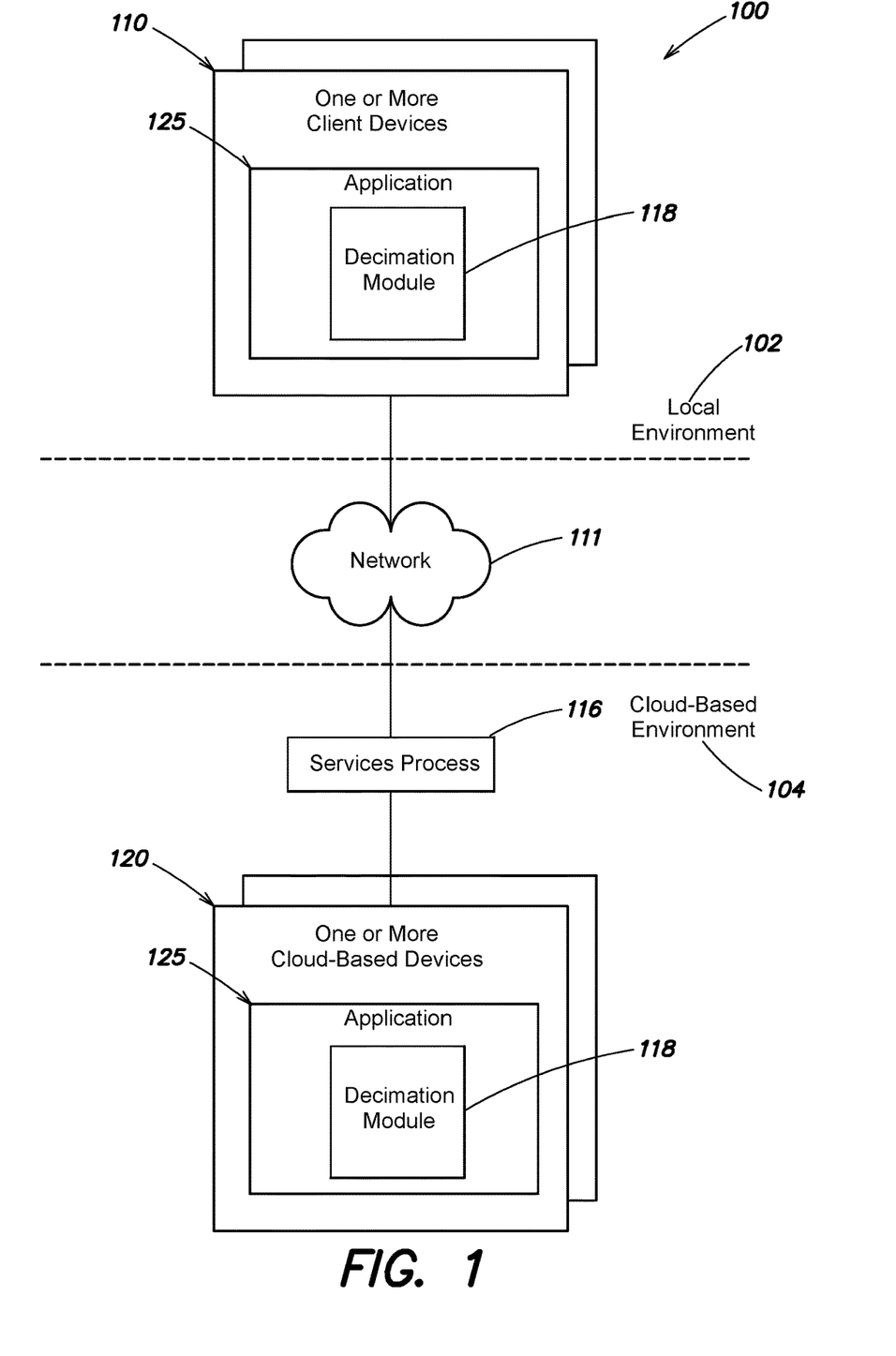
FIG. 1 is a high-level block diagram of an example architecture for determining a stopping condition for 3D model decimation according to one or more embodiments described herein.

FIG. 1 is a high-level block diagram of an example architecture 100 for determining a stopping condition for 3D model decimation according to one or more embodiments described herein. The architecture 100 may be divided into a local environment 102 that includes one or more local client devices 110 that are local to an end-user, and a cloud-based environment 104 that includes one or more cloud-based client devices 120 that are remote from the end-user and that are accessible to the end-user via a network 111 (e.g., the Internet). Each computing device, e.g., one or more local client devices 110 and one or more cloud-based client devices 120, may include processors, memory/storage, a display screen, and other hardware (not shown) for executing software/modules, storing data, and/or displaying information.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. A services process 116 may coordinate operation of the one or more local client devices 110 and the one or more cloud-based client devices 120 such that, for example, the one or more local client devices 110 may communicate with and access the one or more cloud-based client devices 120 via network 111.

The one or more client devices 110 and/or one or more cloud-based client devices 120 may store and execute application 125 that may generate a 3D model of an object and perform a 3D model decimation process. Additionally, the application 125 may determine a stopping condition for the decimation process according to the one or more embodiments as described herein.

In an embodiment, the application 125 may be imaging and/or modeling software that includes a modeling/simulation environment that may generate, e.g., automatically generate, a 3D model of a scene including one or more physical objects, e.g., infrastructure (e.g., buildings, factories, roads, railways, bridges, electrical and communication networks, equipment, etc.), terrain (e.g., earth, rock, water, etc.), people, etc. In an embodiment, the application 125 may execute the 3D model to simulate a behavior of the physical objects in the scene.

For example, a scene may include a building, a tree, and a car. The application 125 may generate a 3D model of the scene that includes a 3D model of the building, a 3D model of the tree, and a 3D model of the car. The 3D model of the building may be represented by a set of vertices, i.e., points, that can be connected by edges, and a closed set of three or more edges may connect to form faces on flat surfaces. The vertices, edges, and faces define the 3D model that represents the shape and physical surface of the building. The 3D models of the tree and car may similarly be represented by connected vertices and faces that define the 3D models of the tree and car. In an embodiment, the application 125 may be the LumenRT™ application available from Bentley Systems, Inc. and that can used with Nvidia® Omniverse available from Nvidia Corporation.

In an embodiment, the 3D model may be referred to as a 3D mesh. As used herein, the terms "3D model" and "3D mesh" may be used interchangeably. Further, it should be understood by those skilled in the art that the 3D model and the 3D mesh as referred herein are computer-generated models.

Although reference may be made to a 3D model, it is expressly contemplated that the one or more embodiments described herein may be applicable to other types of graphical models (e.g., four-dimensional models). As such, the reference to a 3D model as described herein should be taken as illustrative only.

In an embodiment, the one or more local client devices 110 may download and store application 125 according to the one or more embodiments described herein. In an embodiment, the one or more local client devices 110 may utilize one or more user interfaces to access, via services process 116, the application 125 that is stored on the one or more cloud-based client devices 120 according to the one or more embodiments described herein.

The application 125 may include a decimation module 118. The decimation module 118 may perform a model decimation process to simplify the level of detail of the 3D model. As will be described in further detail below, the decimation module 118 may determine a stopping condition for a 3D model decimation process according to the one or more embodiments described herein. In an embodiment, the stopping condition for the 3D model decimation process may be determined based on a size of the 3D model. The decimation module 118 may execute, i.e., perform, a decimation process and stop the decimation process based on the determined stopping condition such that the level of detail of the 3D model is sufficiently simplified while also preserving the shape of the 3D model.

It is expressly contemplated that each of the decimation module 118 may be hardware, software, or a combination thereof. In an embodiment, the processor (not shown) of a local client device 110 may be coupled to the memory (not shown) of the local client device 110, wherein the processor is configured to execute the decimation module. In addition or alternatively, the processor (not shown) of a cloud-based client device 120 may be coupled to the memory (not shown) of the cloud-based client device 120, wherein the processor is configured to execute the decimation module 118.

Figure 2:
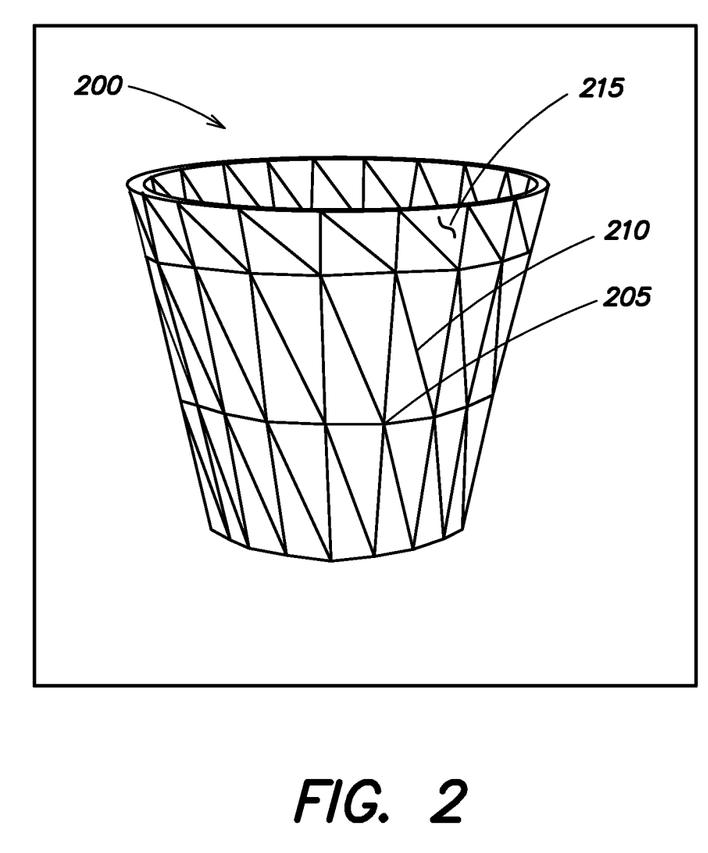
FIG. 2 is an illustrative example of a 3D model of a flowerpot according to the one or more embodiments described herein.

FIG. 2 is an illustrative example of a 3D model 200 of a flowerpot, i.e., object, according to the one or more embodiments described herein. The 3D model includes a plurality of vertices 205 that are connected by edges 210 that form faces 215. In the example of FIG. 2, the faces 215 are triangles. 3D model 200, which is defined by vertices 205, edges 210, and faces 215, represent the exterior surface and shape of a flowerpot.

Although the 3D model 200 of FIG. 2 includes a particular number of vertices 205, edges, 210, and faces 215 that are triangles, it is expressly contemplated that the 3D model 200 may include a larger number or a fewer number of vertices 205, edges 210, and/or faces 215 that are of any shape. As such, it should be understood that the number of vertices 205, edges, 210, and faces 215 that are triangles in FIG. 2 are for illustrative purposes only, and the one or more embodiments described herein may be applicable to any 3D model with any number of vertices, edges, and/or faces that are of any shape.

For simplicity and ease of understanding, only one vertex 205 in FIG. 2 is provided a reference number of 205. However, it is expressly contemplated that each of the vertices of the 3D model 200 in FIG. 2 has a reference number of 205. For simplicity and ease of understanding, only one edge 210 in FIG. 2 is provided a reference number of 210. However, it is expressly contemplated that each of the edges of the 3D model 200 in FIG. 2 has a reference number of 210. For simplicity and ease of understanding, only one face 215 in FIG. 2 is provided a reference number of 215. However, it is expressly contemplated that each of the faces of the 3D model 200 in FIG. 2 has a reference number of 215.

The decimation module 118 may execute a decimation process to remove one or more edges 210, vertices 205, and/or faces of 3D model 200 to simplify the level of detail of 3D model 200. In accordance with an illustrative embodiment and as will be described in further detail below, the decimation module 118 may determine a stopping condition for the decimation process such that the level of detail of 3D model 200 is simplified while also preserving the shape of 3D model 200. By "preserving the shape", it is meant that the shape of the 3D model 200 is not destroyed based on the implementation of the decimation process. To that end, the shape of the 3D model after performance of the decimation process substantially matches the 3D model before the decimation process.

Figure 3:
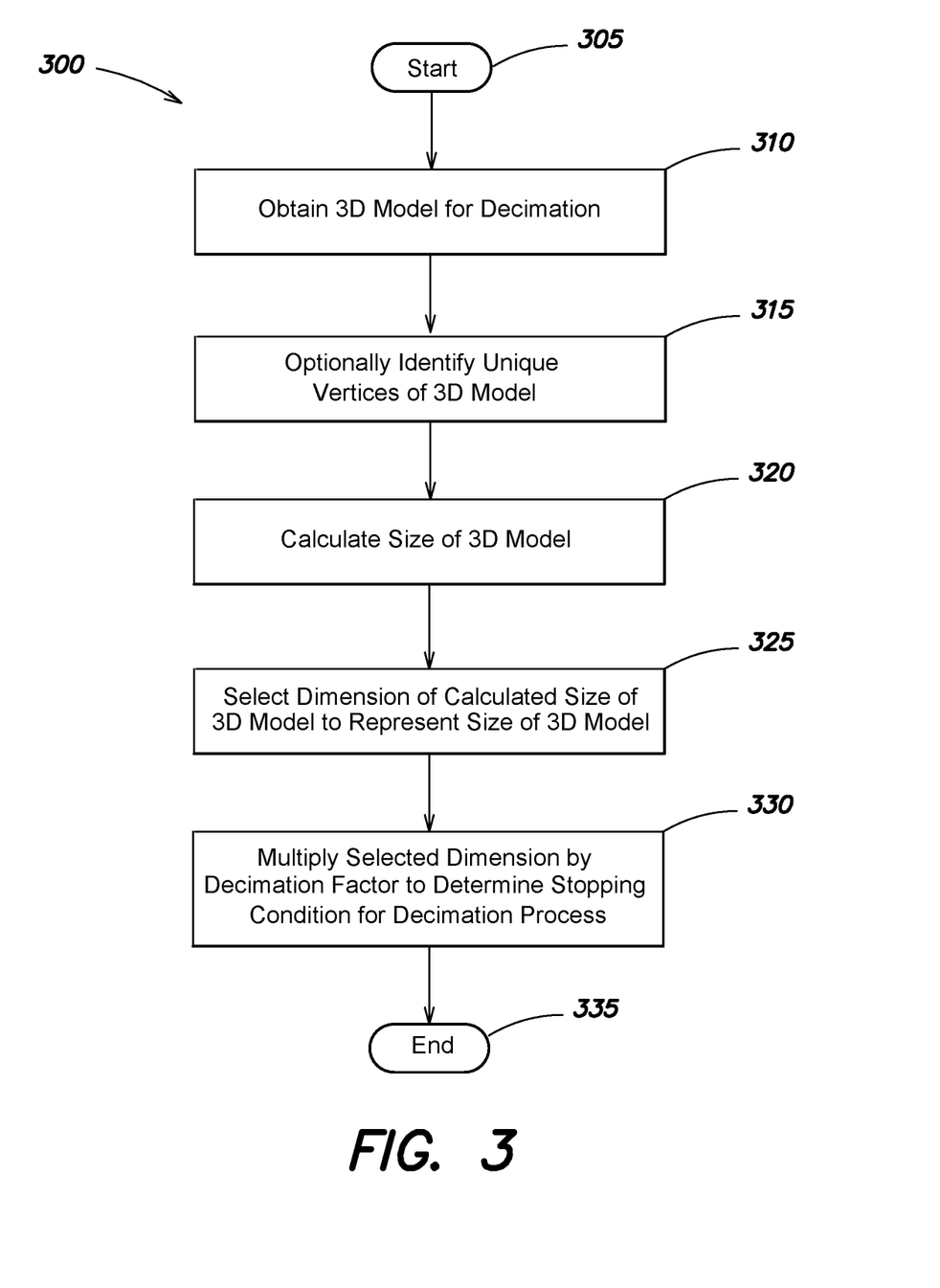
FIG. 3 is a flow diagram of a sequence of steps for determining a stopping condition for a 3D model decimation process according to one or more embodiments described herein.

FIG. 3 is a flow diagram of a sequence of steps for determining a stopping condition for 3D a model decimation process according to one or more embodiments described herein. As will be described in further detail below, the stopping condition may be based on a determined size of the 3D model.

The procedure 300 starts at step 305 and continues to step 310 where the decimation module 118 obtains a 3D model for decimation. In an embodiment, the 3D model may be obtained in a variety of different ways. For example, application 125 may generate a 3D model and provide the 3D model to the decimation module 118. Alternatively, the 3D module may be stored in memory (not shown) and/or external storage (not shown) such as solid-state drive (SSD), hard drive, etc. The decimation module 118 may obtain the 3D model from memory and/or external storage. In this example, let it be assumed that the decimation module 118 obtains 3D model 200 of FIG. 2 that represents the flowerpot.

The procedure optionally continues to step 315. If optional step 315 is not performed, the procedure 300 continues from step 310 to 320. At optional step 315, the decimation module 118 identifies unique vertices of the 3D model. In an embodiment, a unique vertex of a 3D model is a vertex that does not share a location (e.g., x-coordinate, y-coordinate, and z-coordinate) with any other vertex of the 3D model. The decimation module 118 optionally identifies the unique vertices of the 3D model such that step 320 is performed in a more efficient manner as will be described in further detail below.

The procedure continues to step 320 and the decimation module 118 calculates a size of the 3D model. In an embodiment, the size may be calculated as an estimated volume of the 3D model. The decimation module 118 calculates the size of the 3D model by determining a minimum oriented bounding box for the 3D model. In an embodiment, a minimum oriented bounded box is (1) the smallest bounding rectanguloid that completely surrounds all the vertices, edges, and faces of the 3D model, and (2) has an orientation such that the axes of the bounding box matches the local axes of the 3D model that is defined by the vertices, edges, and faces. The decimation module 118 may determine a minimum oriented bounding box for the 3D model in a variety of different ways and as known by those skilled in the art. The decimation module 118 may determine the minimum oriented bounding box for the 3D model in any of a variety of different ways as known by those skilled in the art.

When optional step 315 is performed, only unique vertices are utilized to determine the minimum oriented bounding box for the 3D model. Determining a minimum oriented bounding box utilizing unique vertices, instead of all vertices that include duplicate vertices, conserves processing resources.

The minimum oriented bounding box may be defined by at least three dimension values. The three dimension values may be three unit vectors that represent a length ($\Delta x$), width ($\Delta y$), and height ($\Delta z$) of the minimum oriented bounding box. In this example, let it be assumed that $\Delta x$, $\Delta y$, and $\Delta z$ are, respectively, 20 cm, 21 cm, and 35 cm for the minimum oriented bounding box determined for the 3D model 200 of FIG. 2.

The procedure continues to step 325 and the decimation module 118 selects a dimension, of the calculated size of the 3D model, to represent the size of the 3D model. In an embodiment, the decimation module 118 selects the smallest dimension value of all the dimension values that define the size of the 3D model. For example, the decimation module 118 may select the smallest dimension value of all the dimension values that define the size of the minimum oriented bounding box determined for the 3D model.

In this example, the decimation module 118 selects the $\Delta x$ value of 20 cm, since 20 cm is the smallest value of 20 cm, 21 cm, and 35 cm. As will be described in further detail below, the selected value is utilized to calculate the stopping condition for the decimation process. Because the stopping condition is based on the selected value that is representative of the size of the 3D model, the stopping condition is dependent on the size of the 3D model.

The procedure continues to step 330 and the decimation module 118 multiplies the selected dimension by a decimation factor to determine the stopping condition, e.g., stopping condition value, for the decimation process. In an embodiment, the decimation factor may represent the level of decimation to be performed. For example, the decimation factor may be a percentage value that indicates the level of decimation to be performed. In an embodiment, the decimation factor may be user selected. Alternatively, the decimation factor may be predetermined.

In an embodiment, the decimation factor may be one of (1) 0.025% that represents a low level of decimation, (2) 0.5% that represents a medium level of decimation, or (3) 5% that represents a high level of decimation. Alternatively, the decimation factor may be any percentage, value, or indicator (e.g., "high") that indicates a level of decimation to be performed. In this example, let it be assumed that the decimation factor is 0.5%, e.g., medium level.

Accordingly, the selected value of 20 cm, which is representative of the size of the 3D model, is multiplied with the decimation factor of 0.005. As a result, 0.1 cm is calculated as the stopping condition value for the decimation process of the 3D model 200. In an embodiment, the calculated stopping condition value of 0.1 cm indicate that 0.1 cm is the largest amount of error that is allowed during performance of the decimation process on 3D model 200. As larger amounts of error are allowed (e.g., as the stopping condition value increases), a larger number of edges are removed during the decimation process. For example, more edges will be removed from the 3D model 200 during the decimation process if the stopping condition value is increased from 0.1 cm to 0.5 cm. The procedure then ends at step 335.

As indicated at step 325 of FIG. 3, a single dimension value of the minimum oriented bounding box is selected to represent the size of the 3D model. Because the stopping condition is dependent on the single dimension value, the smallest dimension value may be selected according to the one or more embodiments as described herein. Selecting the smallest dimension value ensures that the smallest stopping condition value is calculated based on all dimensions of the 3D model. This, in turn, prevents the 3D model from being over-decimated and destroyed (i.e., the shape of the 3D model is not preserved) when, for example, a larger dimension value is selected to calculate the stopping condition. Consider the example where a height dimension of a 3D model is significantly larger than a width dimension, and the height dimension is utilized to calculate the stopping condition for the decimation process of the 3D model. In this example, the large dimension height value will result in a large stopping condition value when compared to the stopping condition value that would be calculated based on the width dimension. As such, the width of the 3D model may be destroyed in this example based on the performance of the decimation process that is stopped based on the much larger height value.

By utilizing the smallest dimension value to ensure that the shape of the 3D model is preserved after performance of the decimation process, the one or more embodiments as described herein provide an improvement in the existing technological field of computer based modeling. Specifically, the one or more embodiments described herein provide an improvement in the technological field of 3D model decimation.

Figure 4:
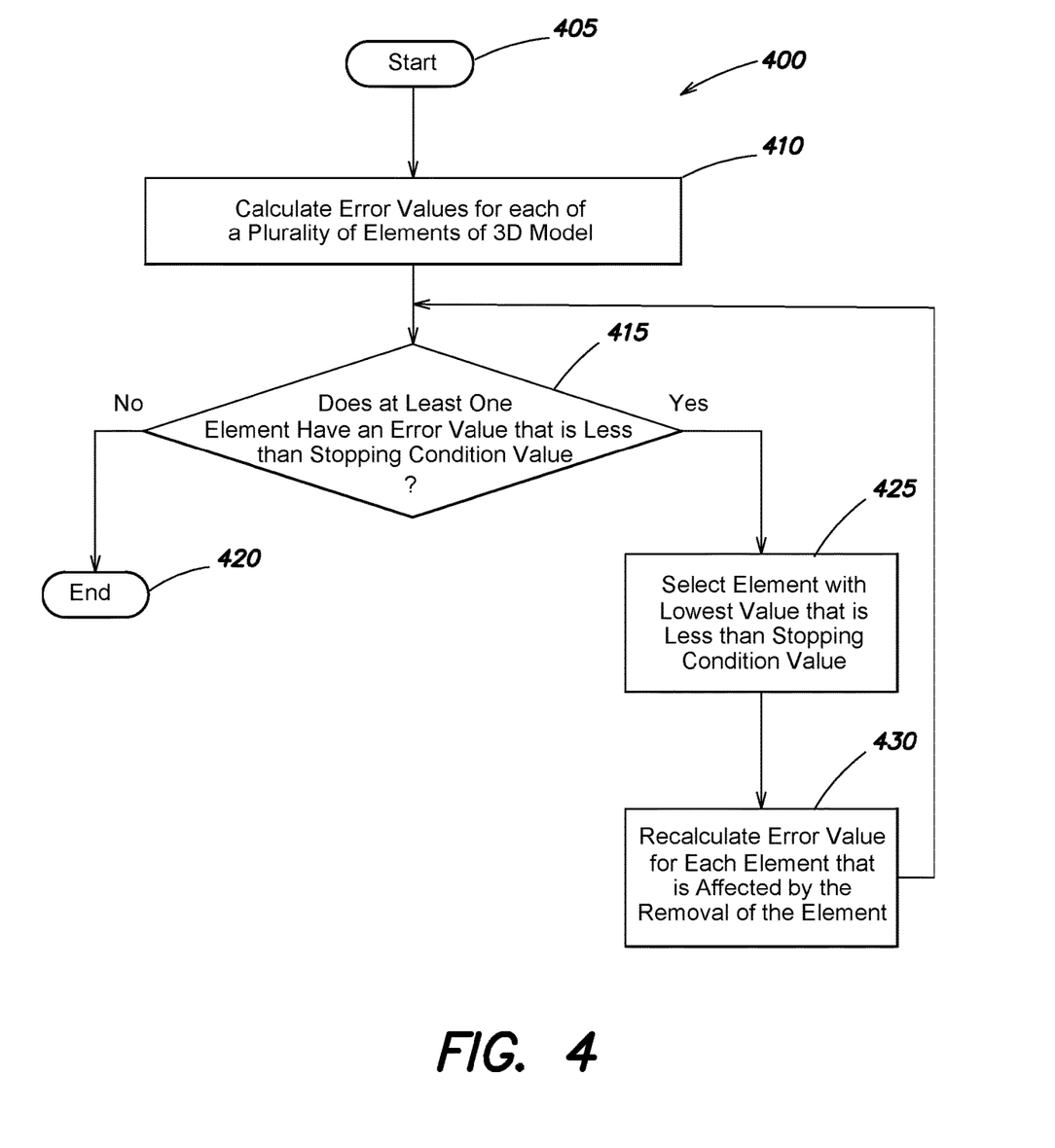
FIG. 4 is a flow diagram of a sequence of steps for performing a decimation process utilizing a calculated stopping condition according to one or more embodiments described herein.

FIG. 4 is a flow diagram of a sequence of steps for performing a decimation process utilizing the calculated stopping condition according to one or more embodiments described herein. The procedure 400 starts at step 405 and continues to step 410 where the decimation module 118 calculates an error value for each of a plurality of elements (e.g., vertices, edges, and/or faces) of the 3D model. In an embodiment, the decimation module 118 calculates an error value for each edge of the 3D model. Continuing with the example of the 3D model 200, the decimation module 118 calculates an error value for each edge 210 of 3D model 200. In an embodiment, the error value for each edge 210 of 3D model 200 may be calculated utilizing a Quadric Error Metric. The Quadric Error Metric may calculate the error value for each edge of the 3D model based on the size of the 3D model. Accordingly, smaller 3D models will have smaller calculated error values when compared to larger 3D models.

The calculated error value may indicate the affect that the removal of the edge has on the visual shape, i.e., visual perceived shape, of the 3D model. In an embodiment, the error value may be in a range and inclusive of the range values. For example, the error value may be in a range from 0 to 100 inclusive of 0 and 100. If the error value for an edge is 0, that may indicate that the removal of the edge will not affect the visual shape of the 3D model. If the error value for an edge is 100, that may indicate that the removal of the edge largely affects the visual shape of the 3D model. In an embodiment, the error value computed for each edge of 3D model 200 has a unit that is the same as the unit for the calculated stopping condition value. Therefore, in this example, the error value computed for each edge 210 of 3D model 200 is in the unit of centimeters since the stopping condition value is calculated in cm, e.g., 0.1 cm.

Consider the example of a cube that has 12 edges that joins the 6 different faces of the cube. The removal of an edge that joins two faces would cause the cube to lose its external shape. As such, each of the 12 edges of the cube may have an error value of 100. The cube may also have other edges that, for example, are on the faces of the cube and between the edges that joint two faces. The removal of these other edges may not have the same effect, on the external shape of the cube, as the removal of the edges that join two different faces of the cube. As such, the error value of these other edges may be a value that is less than 100.

Referring back to FIG. 4, the procedure continues to step 415 and the decimation module determines if at least one element (e.g., edge) has an error value that is less than the stopping condition value. In this example, the stopping condition value is 0.1 cm for 3D model 200 as described above with reference to FIG. 3. Therefore, the decimation module 118 compares the error value computed for each edge 210 of 3D model 200 to the stopping condition value of 0.1 cm. Based on the comparison, the decimation module 118 determines if at least one edge has an error value that are less than 0.1 cm.

If it is determined at step 415 that no element (e.g., edge) has an error value that is less than the stopping condition value, the procedure 400 continues to step 420 and the procedure ends. If it is determined at step 415 that at least one element (e.g., edge) has an error value that is less than the stopping condition value, the procedure continues to step 425. At step 425, the decimation module 118 selects the element (e.g., edge) the lowest error value that is less than the stopping condition value. In an embodiment, the element with the lowest error value is the edge whose removal will have the least impact on the shape of the 3D model.

The procedure continues to step 430, where the decimation module 118 recalculates the error value for each element (e.g., edge) of the 3D model that is affected by the removal of the element (e.g. edge) at step 425. For example, the decimation module 118 recalculates the error value for each edge that shared a vertex with the edge that was removed at step 425. In an embodiment, the error values are recalculated in a similar manner as described above with reference to step 410. From step 430, the procedure reverts back to step 415.

As such, the decimation module 118 implements the decimation process by removing elements (e.g., edges) of the 3D model that have calculated/recalculated error values that are less than the stopping condition value until all remaining elements (e.g., edges) of the 3D model have calculated/recalculated error values that are equal to or greater than the stopping condition value. In an embodiment, a removal of an edge from the 3D model may cause a new collapsed vertex to be generated for the 3D model at location that corresponds to a midpoint or a substantial midpoint of the removed edge. The vertices that were connected to the removed edge may be connected to the collapsed vertex such that an updated 3D model, i.e., decimated 3D model, is generated. Alternatively, any of a variety of different techniques may be utilized to generate an updated 3D model based on the removal of an edge as described herein.

Figure 5:
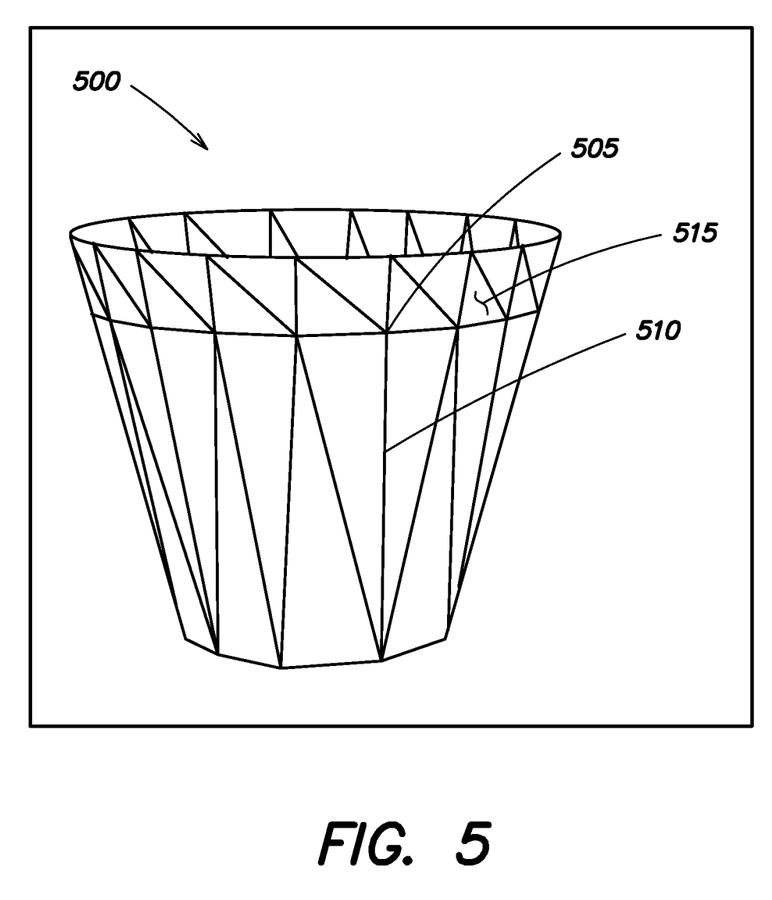
FIG. 5 is an illustrative example of a 3D model of the flowerpot after the performance of the decimation process utilizing the stopping condition according to the one or more embodiments as described herein.

FIG. 5 is an illustrative example of a 3D model 500 of the flowerpot after the performance of the decimation process utilizing the stopping condition value according to the one or more embodiments as described herein. After the performance of the decimation process utilizing the stopping condition value as described above with reference to FIG. 4, 3D model 500 of the flowerpot includes fewer vertices 505, edges 510, and faces 515 when compared to 3D model 200 of FIG. 2. As illustrated in FIG. 5, the level of detail of 3D model 500 is simplified when compared to 3D model 200 of FIG. 2. Additionally, the shape of the flowerpot is preserved such that the shape of 3D model 500 of FIG. 5 after the decimation process substantially matches the shape of the 3D model 200 of FIG. 2 before the decimation process.

In an embodiment, a particular decimated 3D model may be selected from a plurality of decimated 3D models. For example, and as described above with respect to the flow diagram of FIG. 4, the 3D model is continuously decimated until all remaining edges have an error value that are greater than or equal to the stopping condition value. According to the one or more embodiments as described herein, the decimation module 118 may identify a plurality of decimated 3D models that are generated during the decimation process of FIG. 4.

For example, the decimation module 118 may identify the 3D model 500 of the flowerpot as one of the plurality of decimated 3D models. The decimation module 118 may also identify, as the plurality of decimated 3D models, one or more decimated 3D models of the flowerpot that are generated during the decimation process and that are less decimated than 3D model 500 of FIG. 5. The decimation module 118 may, according to the one or more embodiments as described herein, may utilize the position of the camera from which the 3D model is generated and the display characteristics (e.g., aspect ratio, size, etc.) of the window and/or display screen on which the decimated 3D model is to be displayed to select a decimated 3D model of the plurality of decimated 3D models. For example, the decimation module 118 may compare the visual attributes of the plurality of 3D models of the flowerpot with the display characteristics. The decimation module 118 may select a decimated 3D model, of the plurality of decimated 3D models, that will best preserve the visual shape of the flowerpot when displayed in the window and/or on the display screen with the display characteristics. The selected decimated 3D model may then be displayed in the window and/or display screen.

According to the one or more embodiments described herein, the stopping condition value and the error values are both calculated based on the size of the 3D model 200. As such, the decimation results are consistent, e.g., same number of edges are removed, for 3D models of the same object that are of different sizes. As an illustrative example, let it be assumed that 10 edges are removed for 3D model 200 based on the stopping condition value of 0.1 cm and the performance of the decimation process as described with reference to FIG. 4. Additionally, let it be assumed that there is another 3D model of the same shaped flowerpot that is twice as large as the 3D model 200 of FIG. 2. As such, Δx, Δy, Δz are, respectively, 40 cm, 42 cm, and 70 cm for the minimum oriented bounding box for the 3D model of this larger flowerpot. Accordingly, the stopping condition value for the 3D model for this larger flowerpot is 0.2 cm (e.g., 40 cm×0.005). Additionally, the error values for the edges of the 3D model for the larger flowerpot will be two times larger than the error value for the 3D model 200 of FIG. 2.

Because the stopping condition for the 3D model for the larger flowerpot is scaled up by a factor of 2 to account for the fact that the 3D model for the larger flowerpot is two times larger than 3D model 200, the decimation results for the larger flowerpot will be the same as the decimation results for the 3D model 200. Specifically, the decimation process for the 3D model for the larger flowerpot will also result in the removal of 10 edges based on the comparison of the stopping condition value and the error values, both of which are scaled up by a factor of 2. Therefore, and according to the one or more embodiments as described herein, the results of performing a decimation process are independent of the size of the 3D model. That is, the decimation results may remain consistent across 3D models of the same object that vary in size such that the same number of edges are removed according to the one or more embodiments described herein.

By providing consistent decimation results, the one or more embodiments as described herein provide an improvement in the existing technological field of computer based modeling when compared to other conventional decimation techniques that have inconsistent decimation results across 3D models of varying sizes.

Further, by simplifying the level of detail of the 3D model utilizing the stopping condition values as describe herein, less data is stored for the 3D model when compared to conventional techniques that may not perform a decimation process and thus are required to store more data (e.g., additional vertices, edges, and faces) for the 3D computer models. As such, the one or more embodiments as described herein conserve storage resources when compared to conventional techniques. Therefore, the one or more embodiments as described herein provide an improvement to the computer (e.g., storage of client device 110 and/or cloud based devices 120) itself.

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A system comprising:
a processor coupled to a memory, the processor configured to:
determine a size of a three-dimensional (3D) computer model representing a physical object, wherein the 3D computer model includes a plurality of elements that comprise a plurality of vertices, a plurality of edges connecting the plurality of vertices, and a plurality of faces that are formed from the plurality of edges;
multiply the size by a decimation factor of a plurality of different decimation factors, wherein the multiplying generates a decimation stopping condition value; and
perform a decimation process by removing one or more particular elements from the 3D computer model until each remaining element of the 3D computer model has an error value that is equal to or greater than the decimation stopping condition value.

2. The system of claim 1, wherein the processor is further configured to:

determine a minimum oriented bounding box for the 3D computer model to determine the size of the 3D computer model,
  wherein the minimum oriented bounding box is defined by a length value, a width value, and a height value, and
  wherein the size of the 3D computer model is one of the length value, the width value, or the height value.

3. The system of claim 2, wherein the processor is further configured to:
  identify all unique vertices of the 3D computer model, wherein a unique vertex does not share a same location with any other vertex of the 3D computer model; and
  determine the minimum oriented bounding box using the unique vertices.

4. The system of claim 2, wherein the size of the 3D computer model is a smallest value of the length value, the width value, or the height value.

5. The system of claim 1, wherein when performing the decimation process, the processor is further configured to:
  calculate the error value for each of the plurality of edges of the 3D computer model;
  compare the error value, for each of the plurality of edges, to the decimation stopping condition value;
  in response to determining that at least one of the plurality of edges has the error value that is less than the decimation stopping condition value:
    a. remove a selected edge from the 3D computer model that has a smallest error value,
    b. calculate an updated error value for one or more particular edges that share a particular vertex with the selected edge removed from the 3D computer model;
    c. determine if at least one remaining edge of the 3D computer model has a particular error value or a particular updated error value that is less than the decimation stopping condition value; and
    d. in response to determining that the at least one remaining edge has the particular error value or the particular updated error value that is less than the decimation stopping condition value, repeat steps a through d.

6. The system of claim 5, where the error value calculated for each of the plurality of edges of the 3D computer model is calculated utilizing a Quadric Error Metric.

7. The system of claim 5, wherein the error value calculated for each of the plurality of edges of the 3D computer model is based on the size of the 3D computer model.

8. The system of claim 1, wherein a first number of the plurality edges are removed from the 3D computer model in response to performing the decimation process.

9. The system of claim 8, wherein the processor is further configured to:
  determine a different size of a different 3D computer model representing the physical object, wherein the different 3D computer model includes a plurality of different elements that comprise a plurality of different vertices, a plurality of different edges connecting the plurality of different vertices, and a plurality of different faces that are formed from the plurality of different edges;
  multiply the different size by the decimation factor, wherein the multiplying generates a different decimation stopping condition value; and
  perform the decimation process by removing one or more particular different elements from the different 3D computer model until each different remaining element of the different 3D computer model has a different error value that is equal to or greater than the different decimation stopping condition value,
  wherein a second number of the plurality of different edges are removed from the different 3D computer model in response to performing the decimation process, where the second number is equal to the first number.

10. A method, comprising:
  determining a size of a three-dimensional (3D) computer model representing a physical object, wherein the 3D computer model includes a plurality of vertices, a plurality of edges connecting the plurality of vertices, and a plurality of faces that are formed from the plurality of edges;
  multiplying the size by a decimation factor of a plurality of different decimation factors, wherein the multiplying generates a decimation stopping condition value; and
  performing, by a processor, a decimation process by removing one or more particular edges from the 3D computer model until each remaining edge of the 3D computer model has an error value that is equal to or greater than the decimation stopping condition value.

11. The method of claim 10, further comprising:
  determining a minimum oriented bounding box for the 3D computer model to determine the size of the 3D computer model,
    wherein the minimum oriented bounding box is defined by a length value, a width value, and a height value, and
    wherein the size of the 3D computer model is one of the length value, the width value, or the height value.

12. The method of claim 11, further comprising:
  identifying all unique vertices of the 3D computer model, wherein a unique vertex does not share a same location with any other vertex of the 3D computer model; and
  determining the minimum oriented bounding box using the unique vertices.

13. The method of claim 11, wherein the size of the 3D computer model is a smallest value of the length value, the width value, or the height value.

14. The method of claim 10, wherein when performing the decimation process the method further comprising:
  calculating the error value for each of the plurality of edges of the 3D computer model;
  comparing the error value, for each of the plurality of edges, to the decimation stopping condition value;
  in response to determining that at least one of the plurality of edges has the error value that is less than the decimation stopping condition value:
    a. removing a selected edge from the 3D computer model that has a smallest error value,
    b. calculating an updated error value for one or more particular edges that share a particular vertex with the selected edge removed from the 3D computer model;
    c. determining if at least one remaining edge of the 3D computer model has a particular error value or a particular updated error value that is less than the decimation stopping condition value; and
    d. in response to determining that the at least remaining edge has the particular error value or the particular updated error value that is less than the decimation stopping condition value, repeating steps a through d.

15. The method of claim 14, where the error value calculated for each of the plurality of edges of the 3D computer model is calculated utilizing a Quadric Error Metric.

16. The method of claim 10, wherein a first number of the plurality edges are removed from the 3D computer model in response to performing the decimation process.

17. The method of claim 16, further comprising:
determining a different size of a different 3D computer model representing the physical object, wherein the different 3D computer model includes a plurality of different vertices, a plurality of different edges connecting the plurality of different vertices, and a plurality of different faces that are formed from the plurality of different edges;
multiplying the different size by the decimation factor, wherein the multiplying generates a different decimation stopping condition value; and
performing the decimation process by removing one or more particular different edges from the different 3D computer model until each different remaining edge of the different 3D computer model has a different error value that is equal to or greater than the different decimation stopping condition value,
wherein a second number of the plurality of different edges are removed from the different 3D computer model in response to performing the decimation process, where the second number is equal to the first number.

18. A non-transitory computer readable medium having software encoded thereon, the software when executed by one or more computing devices operable to:
determine a size of a three-dimensional (3D) computer model representing a physical object, wherein the 3D computer model includes a plurality of vertices, a plurality of edges connecting the plurality of vertices, and a plurality of faces that are formed from the plurality of edges;
multiply the size by a decimation factor of a plurality of different decimation factors, wherein the multiplying generates a decimation stopping condition value; and
perform a decimation process by removing one or more particular edges from the 3D computer model until each remaining edge of the 3D computer model has an error value that is equal to or greater than the decimation stopping condition value.

19. The non-transitory computer readable medium of claim 18, the software when executed by the one or more computing devices further operable to:
determine a minimum oriented bounding box for the 3D computer model to determine the size of the 3D computer model,
wherein the minimum oriented bounding box is defined by a length value, a width value, and a height value, and
wherein the size of the 3D computer model is one of the length value, the width value, or the height value.

20. The non-transitory computer readable medium of claim 18, wherein when performing the decimation process, the software when executed by the one or more computing devices further operable to:
calculate the error value for each of the plurality of edges of the 3D computer model;
compare the error value, for each of the plurality of edges, to the decimation stopping condition value;
in response to determining that at least one of the plurality of edges has the error value that is less than the decimation stopping condition value:
a. remove a selected edge from the 3D computer model that has a smallest error value,
b. calculate an updated error value for one or more particular edges that share a particular vertex with the selected edge removed from the 3D computer model;
c. determine if at least one remaining edge of the 3D computer model has a particular error value or a particular updated error value that is less than the decimation stopping condition value; and
d. in response to determining that the at least one remaining edge has the particular error value or the particular updated error value that is less than the decimation stopping condition value, repeat steps a through d.

* * * * *

UNITED STATES PATENT AND TRADEMARK OFFICE
CERTIFICATE OF CORRECTION

PATENT NO. : 12,406,327 B2  
APPLICATION NO. : 17/974770  
DATED : September 2, 2025  
INVENTOR(S) : Radojicic Page 1 of 1

It is certified that error appears in the above-identified patent and that said Letters Patent is hereby corrected as shown below:

In the Claims

Claim 1, Column 10, Line 63 reads:  
"until each remaining element of the 3D computer"  
Should read:  
"until each remaining element, of all of the plurality of elements included in the 3D computer"

Claim 10, Column 12, Line 22 reads:  
"computer model until each remaining edge of the 3D"  
Should read:  
"computer model until each remaining edge, of all of the plurality of edges included in the 3D"

Claim 18, Column 14, Line 1 reads:  
"each remaining edge of the 3D computer model has an"  
Should read:  
"each remaining edge, of all of the plurality of edges included in the 3D computer model, has an"

Signed and Sealed this  
Tenth Day of February, 2026

John A. Squires  
*Director of the United States Patent and Trademark Office*